July 25, 1933.   O. F. ROWE   1,919,395
SYNCHRONOUS MOTOR
Filed April 29, 1922
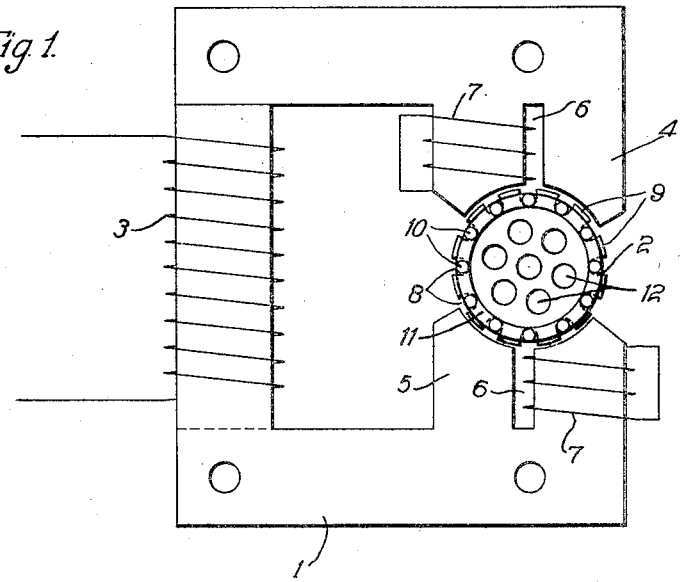
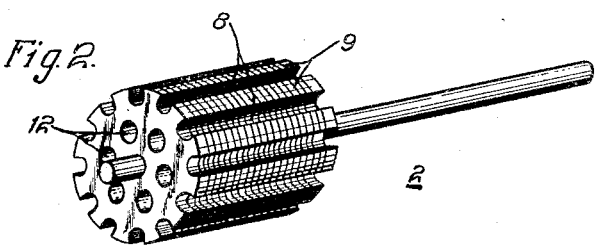
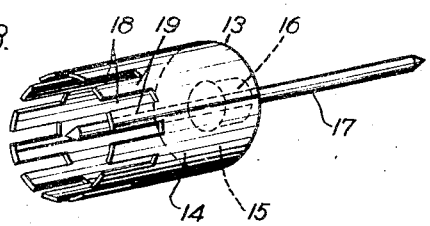
WITNESSES:
INVENTOR
Orvis F. Rowe.
BY
ATTORNEY Patented July 25, 1933

1,919,395

UNITED STATES PATENT OFFICE

ORVIS F. ROWE, OF WILKINSBURG, PENNSYLVANIA, ASSIGNOR TO WESTINGHOUSE ELECTRIC & MANUFACTURING COMPANY, A CORPORATION OF PENNSYLVANIA

SYNCHRONOUS MOTOR

Application filed April 29, 1922. Serial No. 557,294.

My invention relates to self-starting, constant-speed, alternating-current motors and it has particular reference to small synchronous motors designed for clock and meter applications.

The object of my invention is to provide a novel motor of the class described which is self-starting and which is capable of running at a constant speed which is dependent upon the frequency of the supply circuit.

A more specific object of my invention is to provide a synchronous rotor of the reaction type in which the secondary member is provided with a magnetizable core having slots forming a larger number of poles than the poles on the primary member, the poles being so designed that the rotor will positively lock into step at some sub-synchronous speed.

With these and other objects in view, my invention consists of the novel structure and arrangement disclosed in the following description and illustrated in the accompanying drawing wherein Fig. 1 is an enlarged diagrammatic end view of a motor embodying my invention.

Fig. 2 is an enlarged perspective view of the rotor core member illustrated in Fig. 1.

Fig. 3 is an enlarged perspective view of a modified form of rotor member.

In the embodiment of my invention shown in Fig. 1, the motor consists of a stationary primary member 1 and a rotating secondary member 2. The stator 1 comprises a bipolar yoke member having an alternating-current exciting coil 3 and polar projections 4 and 5. Each of the polar projections is divided into two parts or sections by means of a slot 6, and the trailing section of each polar member is provided with three or four turns of a short circuited shading coil 7.

The rotor member 2 is made of laminations of magnetizable material having an even number of slots, for example, twelve slots 8, providing as many salient poles 9 therebetween. The slots 8 receive armature conductors 10 which are short-circuited by end rings 11 to form a squirrel-cage construction. The core member may also be provided with a plurality of openings, for example, six openings 12, disposed underneath the slots 8, as shown in Fig. 1.

The width and relative spacing of the pole sections and the strength of the shading coils are all so proportioned and designed, in relation to the number of slots, that the motor will operate at constant or synchronous speed as a twelve-pole reaction motor, or, in general, as a motor having as many poles as slots, and, when the motor is so operating an armature pole will come under each of the pole sections as the alternating flux in each pole section approaches a maximum value in either direction.

In will be observed that in my preferred construction as just described, I believe that each of the two parts or sections into which each stator polar projection 4 or 5 is divided by means of the slot 6 is utilized as a separate synchronizing pole-piece, for locking with the rotor poles at the twelve-pole synchronous speed, rather than utilizing the whole face of one polar projection 4 as a north pole at the same moment that the other polar projection 5 is utilized in its entirety as a south pole. While my separate utilization of the individual stator half-poles or sections as synchronizing poles, rather than the whole polar projection 4 or 5, may not be absolutely essential, I believe that best results are obtained by my design as described, and to this end it is necessary that the widths and spacing of the two pole-halves, and the phase-angle through which the flux is dephased by the shading coil 7, be carefully correlated. This may be explained as follows.

Reference to Fig. 1 will show, by way of illustrating the general principles of my invention, that when one-half of a stator pole is in pole-coincidence with the rotor member, or when the center of said stator pole-half is coincident with the center of a rotor slot, in the particular motor illustrated, the other half of the stator pole is displaced by an angular distance of something like 5° 20′ from a similar relationship to the rotor member. Thus, the center-lines of the two stator pole-halves are separated by an angular distance of about 65° 20′. The rotor must turn through an angular displacement of 5° 20′, or, as it rotates at ⅙ speed, this means that the rotor must turn through an electrical displacement of 6×(5° 20′), or 32 electrical degrees, in the particular design shown, in the time-interval between maximum flux in the unshaded pole-half and maximum flux in the shaded pole-half, the distance between the center-lines of two adjacent rotor poles being 180 electrical degrees.

According to my design, the shading coil 7 preferably causes a phase-lag of somewhere around the same number of electrical degrees, or 32° in the illustration given, in the flux in the shaded pole-half, as compared to that in the unshaded pole-half, which is much better than a construction calling for a 90° or quarter-cycle flux-shift which is not only impossible of actual attainment with a simple shading coil as shown, but involves a very weak shaded-pole flux if it is even approximated.

The angular velocity of the shifting flux in the split pole-halves of each polar projection 4 or 5 of the stator is also different from the speed of rotation of the rotor. Thus the stator flux is shifting, due to the shading coils, through $$\frac{65.33}{360}$$

of a revolution in $$\frac{32}{360},$$

of a cycle, or at the rate of approximately $$\frac{65.33}{360} \times \frac{360}{32} \times 60 \times 60 = 735 \text{ R. P. M.,}$$

as compared to the rotor speed of 600 R. P. M., on a 60-cycle system. Considering the stator flux-shift from one north pole to a diametrically opposite south pole, the stator flux-rotation, averaged over the entire circumference, is at the two-pole rate of one revolution per cycle, or 3600 R. P. M., just six times the speed of the rotor.

Attention is also directed to the fact that each half-pole of the stator is wide enough to span a plurality of rotor teeth, in the illustrated motor two rotor teeth. This is advantageous in many designs in securing more flux-interlinkages and more torque than would be obtained if the stator half-poles had a span of one rotor tooth. My invention, in its broadest aspects, is not limited, however, to this particular pole-span.

My rotor core is made of laminations of the usual core material, which is a "soft" iron or steel in which it is easy to shift or reverse the flux without any material remanent or "permanent" magnetism. Thus the salient poles or teeth 9 of the rotor readily change from north poles to south poles and back again throughout each revolution. This reversal of polarity in the rotor poles is necessitated, in my preferred design, for three reasons. In the first place, the rotor poles cannot be permanently magnetized, alternately "north" and "south", poles if the above-described locking actions of the individual stator pole-halves is to be made available to increase the synchronizing torque, because the two halves of each stator split-pole are of the same polarity. In the second place, in a motor utilizing a rotor pole-number (in this case 12) which is an even multiple of the stator pole-number (in this case 2), an even-numbered rotor pole is under the stator north pole at the same time that another even-numbered rotor pole is under the stator south pole, so that the rotor poles cannot be alternately north and south, with the odd-numbered poles for example north and the even-numbered poles for example south. In the third place, my use of wide stator half-poles, spanning two or more rotor teeth at a time, precludes the possibility of advantageously utilizing a rotor design in which the poles are alternately north and south. Of these three design-features the use of an even number of pairs of rotor teeth and the use of a double-tooth stator half-pole span are by no means essential, but I regard the first feature as being quite important, requiring a phase-angle flux-lag in the shaded pole-halves somewhere nearly approximating the number of electrical degrees through which the rotor must turn in passing from a position of pole-coincidence with the unshaded pole-halves to a position of pole-coincidence with the shaded pole-halves, so that an armature pole, or a pair of armature poles, will come under each of the pole-halves as the alternating flux therein approaches a maximum value either as a north pole or as a south pole.

Attention is further directed to the fact that I utilize all of the stator flux for both my induction-motor torque and my reaction-motor or synchronizing torque, thereby obtaining the maximum possible efficiency in a given space. This is accomplished by having my induction-motor short-circuited current-paths surround the salient pole-pieces 9 of my rotor member.

It will, of course, be obvious that additional squirrel-cage conductors may be added in substantially closed slots between the open slots without affecting the speed, which is determined by the number of open slots or salient poles.

Fig. 3 shows a modified form of rotor member comprising a cup-shaped member 13 of magnetizable material having a cylindrical portion 14 and end member 15. The latter member is provided with a protuberance 16 forming an attachment for a shaft 17. The free end of the cylindrical portion 14 is provided with a number of slots 18 forming polar projections 19 therebetween.

In operation, the rotor of Fig. 3 starts as an induction motor by reason of the eddy currents generated in the unslotted portion of the cylindrical part 14, and, when the synchronous speed corresponding to the number of polar projections 19 is reached, said projections will cause the rotor to lock into step and to maintain a constant speed.

It will be obvious from the foregoing that many changes and substitutions of equivalents may be made by those skilled in the art without departing from the essential features of my invention, and I do not desire to be limited to the specific construction shown except in so far as may be required by the language of the appended claims when read in the light of the prior art.

I claim as my invention:

1. A single-phase induction motor comprising a stator member having split poles and shading coils on the trailing sections of said split poles, and a rotor member comprising a magnetizable core member having open slots providing a larger number of poles than said stator poles and a squirrel-cage winding comprising conductors disposed in said rotor slots, the parts being so designed that the rotor poles lock into synchronism with the stator poles at a sub-synchronous speed.

2. A single-phase induction motor comprising a stator member having split poles and shading coils on the trailing sections of said split poles, and a rotor member comprising a magnetizable core member having open slots providing a larger number of poles than said stator poles and a squirrel cage winding comprising conductors disposed in said rotor slots, the parts being so designed that the rotor poles lock into synchronism with the stator poles at a synchronous speed corresponding to the rotor-pole number, substantially as described.

3. A single-phase induction motor comprising a shaded-pole primary member and a squirrel-cage secondary member, the squirrel cage being supported by a body of magnetic material which constitutes a reaction-motor secondary having a greater number of poles than the primary member, the relative effects of the induction and reaction characteristics of the secondary member being such that the motor starts as an induction motor and runs at subsynchronous speed as a reaction motor with considerable induction-motor torque.

4. An induction reaction motor comprising a single-phase, bipolar, shaded-pole, primary-stator member and a secondary rotor member made up of a squirrel-cage winding mounted on a body of magnetic material forming a reaction-motor secondary member of a greater number of poles than the primary member, the reaction-motor torque being greater than the induction-motor torque at a speed corresponding to the pole number of the reaction-motor secondary.

5. A synchronous motor comprising a stator having a plurality of magnetizable pole-pieces and a rotor having a larger number of magnetizable pole-pieces, and lag-means on the stator for retarding the flux in some of the stator pole-pieces with respect to the flux in adjacent stator pole-pieces, the distance between the center-line of a delayed-flux pole-piece and the center-line of the adjacent pole-piece being such that the time required for the rotor to move, at its rated synchronous speed, from a position of substantial pole-coincidence with the last-mentioned stator pole-piece to a position of substantial pole-coincidence with the corresponding delayed-flux pole-piece is materially less than a quarter of a cycle, the amount of dephasing of the flux lag-means being approximately the same portion of a cycle materially less than a quarter of a cycle.

6. A self-starting synchronous motor comprising a stator having a plurality of magnetizable pole-pieces and a rotor having a larger number of magnetizable pole-pieces, lag-means on the stator for retarding the flux in some of the stator pole-pieces with respect to the flux in adjacent stator pole-pieces, the distance between the center-line of a delayed-flux pole-piece and the center-line of the adjacent pole-piece being such that the time required for the rotor to move, at its rated synchronous speed, from a position of substantial pole-coincidence with the last-mentioned stator pole-piece to a position of substantial pole-coincidence with the corresponding delayed-flux pole-piece is materially less than a quarter of a cycle, and induction-motor means surrounding the rotor pole-pieces for causing the rotor to start when energy is applied to the motor.

7. A shaded-pole synchronous motor comprising a stator having a plurality of magnetizable pole-pieces and a rotor having a plurality of magnetizable pole-pieces, and lag-means on the stator for retarding the flux in some of the stator pole-pieces with respect to the flux in adjacent stator pole-pieces, the distance between the center-line of a delayed-flux pole-piece and the center-line of the adjacent pole-piece being such that the time required for the rotor to move, at its rated synchronous speed, from a position of substantial pole-coincidence with the last-mentioned stator pole-piece to a position of substantial pole-coincidence with the corresponding delayed-flux pole-piece is materially less than a quarter of a cycle, the amount of dephasing of the flux lag-means being approximately the same portion of a cycle materially less than a quarter of a cycle, the synchronous speed of the rotor being less than the average speed of rotation of the stator flux from a pole which is north at one moment to a pole that was south at that moment.

8. A shaded-pole synchronous motor comprising a stator having a plurality of magnetizable pole-pieces and a rotor having a plurality of magnetizable pole-pieces, and lag-means on the stator for retarding the flux in some of the stator pole-pieces with respect to the flux in adjacent stator pole-pieces, the distance between the center-line of a delayed-flux pole-piece and the center-line of the adjacent pole-piece being such that the time required for the rotor to move, at its rated synchronous speed, from a position of substantial pole-coincidence with the last-mentioned stator pole-piece to a position of substantial pole-coincidence with the corresponding delayed-flux pole-piece is materially less than a quarter of a cycle, the amount of dephasing of the flux lag-means being approximately the same portion of a cycle materially less than a quarter of a cycle, the spatial angular distance between the center-lines of one of said delayed-flux stator pole pieces and its corresponding adjacent pole-piece, in space degrees, being materially greater than the electrical displacement of the rotor member, in electrical degrees, in moving from substantial pole-coincidence with one stator pole-piece to the other, counting the distance between two adjacent rotor pole-pieces as 180 electrical degrees.

9. A self-starting subsynchronous-speed motor comprising a split-pole stator member and an open-slot squirrel-cage rotor member, each pole-half of a split stator pole being wide enough to substantially span a plurality of rotor teeth, the spacing of the two pole-halves of each stator split-pole being such that only one of said pole-halves is in substantial pole-coincidence with the rotor teeth at a time. and flux lag-means associated with one pole-half of each stator split-pole.

10. A self-starting synchronous motor comprising a stator having a plurality of magnetizable pole-pieces and a rotor having a larger number of magnetizable pole-pieces, lag-means on the stator for retarding the flux in some of the stator pole-pieces with respect to the flux in adjacent stator pole-pieces, each stator pole-piece being wide enough to substantially span a plurality of rotor pole-pieces, and induction-motor means on the rotor for causing the rotor to start when energy is applied to the motor.

11. A self-starting synchronous motor comprising a stator having a plurality of magnetizable pole-pieces and a rotor having a larger number of magnetizable pole-pieces, lag-means on the stator for retarding the flux in some of the stator pole-pieces with respect to the flux in adjacent stator pole-pieces, the distance between the center-line of a delayed-flux pole-piece and the center-line of the adjacent pole-piece being materially greater than the distance which the rotor must move to move from a position of substantial pole-coincidence with the last-mentioned stator pole-piece to a position of substantial pole-coincidence with the corresponding delayed-flux pole-piece, and induction-motor means surrounding the rotor pole-pieces for causing the rotor to start when energy is applied to the motor.

12. A self-starting subsynchronous-speed motor comprising a split-pole stator member and an open-slot squirrel-cage rotor member having squirrel-cage bars and rotor pole-pieces between the bars, and flux lag-means associated with one pole-half of each stator split-pole, the spacing of the two pole-halves of each stator split-pole being such that the time required for the rotor to move, at its rated synchronous speed, from a position of substantial pole-coincidence with the last-mentioned stator pole-piece to a position of substantial pole-coincidence with the corresponding delayed-flux pole-piece is materially less than a quarter of a cycle, the amount of dephasing of the flux lag-means being approximately the same portion of a cycle materially less than a quarter of a cycle.

13. A self-starting, single-phase synchronous motor comprising a field member having split salient poles and means for dephasing the flux in one portion of each pole, whereby a rotating component field is established for starting purposes, and a relatively rotating member having a conducting portion providing a plurality of short-circuited paths for operating on the induction-motor principle and having magnetizable material forming a salient-pole construction, the distances between the center-lines of the portions of the split poles being such that the time required for the relatively rotating member to move, at its rated synchronous speed, from a position of substantial pole-coincidence with the unshaded portion of a split salient pole to a position of substantial pole-coincidence with the dephased-flux portion thereof is materially less than a quarter of a cycle, the amount of dephasing of the flux-dephasing means being approximately the same portion of a cycle materially less than a quarter of a cycle.

14. A self-starting, single-phase synchronous motor comprising a field member having split salient poles and means for dephasing the flux in one portion of each pole, whereby a rotating component field is established for starting purposes, and a relatively rotating member having a conducting portion providing a plurality of short-circuited paths for operating on the induction-motor principle and having magnetizable material forming a salient-pole construction, the number of salient poles of the relatively rotating member being greater than the number of poles of the rotating component field, the distances between the center-lines of the portions of the split poles being such that the time required for the relatively rotating member to move, at its rated synchronous speed, from a position of substantial pole-coincidence with the unshaded portion of a split salient pole to a position of substantial pole-coincidence with dephased-flux portion thereof is materially less than a quarter of a cycle, the amount of dephasing of the flux-dephasing means being approximately the same portion of a cycle materially less than a quarter of a cycle.

15. An alternating-current motor comprising a field member having salient poles, each of said poles being split into two halves, means for causing the alternating magnetic field in one of the halves of each pole to lag behind the other, and an armature having characteristics producing the effect of a plurality of salient poles, the number of armature poles being a multiple of the number of field poles, the width and relative spacing of the pole halves being such that the time required for the relatively rotating member to move, at its rated synchronous speed, from a position of substantial pole-coincidence with the unshaded portion of a split salient pole to a position of substantial pole-coincidence with the dephased-flux portion thereof is materially less than a quarter of a cycle, and the amount of dephasing of the flux lag-means being approximately the same portion of a cycle materially less than a quarter of a cycle.

16. An alternating-current motor comprising an armature member having characteristics producing the effect of a relatively large number of salient poles, means on said armature for causing the same to operate as the secondary member of an induction motor, and an inducing member for producing rotation of said armature member, said inducing member having a smaller number of poles than said armature member, each of the poles on the inducing member being split into two halves, the width and relative spacing of the pole halves being such that the time required for the relatively rotating member to move, at its rated synchronous speed, from a position of substantial pole-coincidence with one half-portion of a split salient pole to a position of substantial pole-coincidence with the other half-portion thereof is materially less than a quarter of a cycle, and means for causing the alternating magnetic field in the last-mentioned half of each pole to lag behind the first-mentioned half by approximately the same portion of a cycle materially less than a quarter of a cycle.

17. A self-starting synchronous motor comprising cooperating stator and rotor elements, means associated with said stator element for producing a strongly pulsating, shifting magnetic field through said rotor element, a salient-pole magnetic circuit on said rotor element and a short-circuited current path surrounding the rotor salient poles, said salient-pole magnetic circuit being designed to give the rotor a predominating reactance characteristic at an operating speed where considerable induction motor action exists.

18. In an alternating current motor, the combination with a stator having means for producing a strongly pulsating, shifting magnetic field, of a rotor provided with a squirrel cage winding having squirrel-cage bars and rotor pole-pieces between said bars designed to magnetically interpose resistance to, and thereby prevent, the attainment by said rotor of its free running speed.

19. A self-starting, single-phase synchronous motor comprising a field member having split salient poles and means for dephasing the flux in one portion of each pole, whereby a rotating component field is established for starting purposes, and a relatively rotating member having magnetizable material forming a salient-pole construction and having a relatively non-magnetic conducting portion providing a plurality of short-circuited paths including paths surrounding said last-mentioned salient poles for operating on the induction-motor principle, the salient poles of the field member and of the relatively rotating member being so related that the motor is caused to lock into synchronism at a speed less than the normal induction-motor speed.

20. A self-starting, single-phase synchronous motor comprising a field member having split salient poles and means by dephasing the flux in one portion of each pole, whereby a rotating component field is established for starting purposes, and a relatively rotating member having magnetizable material forming a salient-pole construction and having a relatively non-magnetic conducting portion providing a plurality of short-circuited paths including paths surrounding said last-mentioned salient poles for operating on the induction-motor principle, the number of salient poles of the relatively rotating member being greater than the number of poles of the rotating component field.

21. A self-starting, single-phase synchronous motor comprising a field member having split salient poles and means for dephasing the flux in one portion of each pole, whereby a rotating component field is established for starting purposes, and a relatively rotating member having magnetizable material forming a salient-pole construction and having a relatively non-magnetic conducting portion providing a plurality of short-circuited paths including paths surrounding said last-mentioned salient poles for operating on the induction-motor principle, the distances between the center lines of the portions of the split poles being so related to the amount of dephasing of the flux and the synchronous speed at which the motor is designed to operate that the salient poles of the relatively rotating member are successively attracted, at substantially the proper times, by the respective portions of the split poles, to cause the motor to operate at a fixed speed less than the speed corresponding to the number of poles on the field member.

22. A self-starting, single-phase synchronous motor comprising a field member having split salient poles and means for dephasing the flux in one portion of each pole, whereby a rotating component field is established for starting purposes, and a relatively rotating member having magnetizable material forming a salient-pole construction and having a relatively non-magnetic conducting portion providing a plurality of short-circuited paths including paths surrounding said last-mentioned salient poles for operating on the induction-motor principle, the number of salient poles of the relatively rotating member being greater than the number of poles of the rotating component field, the distances between the center lines of the portions of the split poles being so related to the amount of dephasing of the flux and the synchronous speed at which the motor is designed to operate that the salient poles of the relatively rotating member are successively attracted, at substantially the proper times, by the respective portions of the split poles.

23. A self-starting, single-phase synchronous motor comprising a field member having split salient poles and a shading coil on one portion of each pole, and an open-slot, squirrel-cage secondary member having squirrel-cage bars and salient pole-pieces between the bars cooperating therewith in such manner that the squirrel-cage salient pole-pieces cooperate with the portions of the split poles to cause the motor to operate, under normal load conditions, at a synchronous speed less than the induction-motor speed.

24. A self-starting alternating-current motor comprising a field member having salient polar members having axially extending splits therein, means for producing a rotating magnetic field in said field member, and an armature mounted for rotation relative to said field member, said armature comprising means constituting a salient-pole synchronous motor member having a relatively large number of salient poles and means constituting an induction-motor secondary member surrounding said last-mentioned salient poles and tending to accelerate said motor almost to full synchronous speed corresponding to the number of salient polar members of said field member, said armature salient poles being adapted to lock into step with respect to the split portions of said field polar members at a definite sub-synchronous speed.

25. A self-starting single-phase motor comprising a bi-polar field member, each pole piece thereof being split longitudinally and having a shading coil on one of the split portions, a single-phase coil for magnetizing said field member, and an armature mounted for rotation relative to said field member, said armature comprising means constituting a salient-pole synchronous-motor member having a relatively large number of salient poles and means constituting a relatively non-magnetic induction-motor secondary member surrounding said last-mentioned salient poles and tending to accelerate said motor almost to full bi-polar synchronous speed, said armature salient poles being adapted to lock into step with respect to the split portions of said field pole pieces at a definite sub-synchronous speed.

26. An induction reaction motor having a salient-pole primary member and a salient-pole secondary member, an induction-motor secondary winding surrounding the salient poles of said secondary member, the salient poles of said secondary member constituting a reaction-motor secondary having a greater number of poles than the primary member, said secondary member being so designed that the reaction-motor torque at the synchronous speed corresponding to the pole number of the secondary is in excess of the induction-motor torque at said speed, whereby said motor is capable of simultaneously operating as an induction motor and a reaction motor at a synchronous speed corresponding to the number of poles of the reaction-motor secondary.

27. An alternating current motor having a single-winding, shaded-pole, primary member and a squirrel-cage secondary member comprising squirrel-cage bars and a magnetic circuit including salient magnetic poles between said bars in excess of the pole number of the primary winding, said motor having a reactionary torque due to said salient poles which is in excess of the induction-motor torque at a speed corresponding to the said salient pole number, and an induction-motor starting torque in excess of the tendency of the salient poles to lock the motor at standstill whereby said motor is enabled to start as an induction motor and to run under load at such speed as a combined induction and reaction motor.

28. A single-phase reaction induction motor having cooperating primary and secondary members, said primary member comprising a shaded-pole bi-polar stator and said secondary comprising a laminated-core squirrel-cage induction motor having a relatively large number of symmetrically disposed slots in which the squirrel-cage bars are located, said slots forming salient poles in the rotor laminations whereby said motor is caused to start as an induction-motor and run as a reaction motor at a speed corresponding to the rotor pole-number, said reactionary torque being in excess of the squirrel-cage torque at such speed.

29. A single-phase reaction induction motor having cooperating primary and secondary members, said primary member comprising a shaded-pole bi-polar stator and said secondary comprising a laminated core squirrel-cage induction motor having an even number of pairs of symmetrically disposed slots in which the squirrel-cage bars are located, said slots forming salient poles in the rotor laminations whereby said motor is caused to start as an induction motor and run as a reaction motor at a speed corresponding to the rotor pole-number, said reactionary torque being in excess of the squirrel-cage torque at such speed.

ORVIS F. ROWE.